(12) United States Patent
Danforth et al.

(10) Patent No.: US 10,654,762 B2
(45) Date of Patent: May 19, 2020

(54) ADDITIVE MANUFACTURED COMBUSTIBLE ELEMENT WITH FUEL AND OXIDIZER

(71) Applicant: Raytheon Company, Waltham, MA (US)

(72) Inventors: Jeremy C. Danforth, Tucson, AZ (US); Mark T. Langhenry, Tucson, AZ (US); Matt H. Summers, Gilbert, AZ (US); Teresa Perdue, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 66 days.

(21) Appl. No.: 16/125,871

(22) Filed: Sep. 10, 2018

(65) Prior Publication Data

US 2019/0002362 A1    Jan. 3, 2019

Related U.S. Application Data

(62) Division of application No. 14/729,429, filed on Jun. 3, 2015, now Pat. No. 10,093,592.

(51) Int. Cl.
*C06B 45/10* (2006.01)
*F02K 9/12* (2006.01)
(Continued)

(52) U.S. Cl.
CPC .......... *C06B 45/10* (2013.01); *C06B 21/0033* (2013.01); *F02K 9/12* (2013.01);
(Continued)

(58) Field of Classification Search
CPC ...................................... C06B 45/10
See application file for complete search history.

(56) References Cited

U.S. PATENT DOCUMENTS 3,527,168 A      9/1970   McCurdy et al.
3,995,559 A  *  12/1976   Bice ................... C06B 45/12
                                                              102/284

(Continued)

OTHER PUBLICATIONS

International Search Report and Written Opinion for corresponding International Application No. PCT/US2016/015960 dated May 29, 2016.

*Primary Examiner* — Aileen B Felton
(74) *Attorney, Agent, or Firm* — Renner, Otto, Boisselle & Sklar, LLP

(57) ABSTRACT

A combustible element includes regions of fuel material interspersed with regions of oxidizer material. The element may be made by additive manufacturing processes, such as three-dimensional printing, with the fuel material regions and the oxidizer material regions placed in appropriate locations in layer of the combustible element. For example, different extruders may be used to extrude and deposit portions of a fuel filament and an oxidizer filament at different locations in each layer of the combustible element. The combustible element may define a combustion chamber within the element, where combustion occurs when the combustible element is ignited. The fuel material and the oxidizer material may be selected, and their relative amounts may be controlled, such that desired relative amounts of fuel and oxidizer are present for combustion with desired characteristics, such as combustion rate.

11 Claims, 3 Drawing Sheets

(51) Int. Cl.
*C06B 21/00* (2006.01)
*B33Y 10/00* (2015.01)
*B33Y 80/00* (2015.01)

(52) U.S. Cl.
CPC ............... *B33Y 10/00* (2014.12); *B33Y 80/00* (2014.12); *F05D 2230/31* (2013.01)

(56) References Cited

U.S. PATENT DOCUMENTS

| | | |
|---|---|---|
| 6,311,479 B1 | 11/2001 | Lo |
| 8,225,507 B2 | 7/2012 | Fuller |
| 2002/0157557 A1 | 10/2002 | Cesaroni et al. |
| 2010/0281850 A1 | 11/2010 | Fuller |
| 2013/0042951 A1 | 2/2013 | Fuller |
| 2016/0355447 A1 | 12/2016 | Danforth et al. |

\* cited by examiner

ADDITIVE MANUFACTURED COMBUSTIBLE ELEMENT WITH FUEL AND OXIDIZER

CROSS REFERENCE TO RELATED APPLICATION

This is a divisional application of U.S. patent application Ser. No. 14/729,429, filed Jun. 3, 2015, which is hereby incorporated by reference in its entirety.

FIELD OF THE INVENTION

The invention is in the field of combustible elements, such as for rocket motors or other energetic components.

DESCRIPTION OF THE RELATED ART

Additive-manufactured fuel grains have been produced before, albeit for rocket motors using conventional metal casings and nozzles.

SUMMARY OF THE INVENTION

A combustible element includes a matrix of fuel regions and oxidizer regions. The element may be made by an additive manufacturing process, with the fuel and oxidizer regions laid down in a number of layers.

According to an aspect of the invention, a combustible element includes fuel; and oxidizer; wherein the fuel and the oxidizer are interspersed in discrete separate regions within a single solid element; and wherein the combustible element defines a combustion chamber therewithin where combustion of the fuel and the oxidizer occurs upon ignition of the fuel and the oxidizer.

According to an embodiment of the device of any prior paragraph(s), the regions include: fuel regions that contain the fuel; and oxidizer regions that contain the oxidizer; and the oxidizer regions also contain a continuous material that acts as a binder.

According to an embodiment of the device of any prior paragraph(s), the separate regions make up a matrix of regularly-ordered fuel regions and oxidizer regions, with alternating fuel regions and oxidizer regions.

According to an embodiment of the device of any prior paragraph(s), the element is produced by an additive manufacturing process.

According to an embodiment of the device of any prior paragraph(s), the fuel includes a first thermoplastic continuous material, with a metal additive.

According to an embodiment of the device of any prior paragraph(s), the oxidizer includes a second thermoplastic continuous material, with an oxidizer additive.

According to an embodiment of the device of any prior paragraph(s), the oxidizer additive includes beads of oxidizer material within the second thermoplastic continuous material.

According to an embodiment of the device of any prior paragraph(s), the oxidizer additive includes droplets of oxidizer material within the second thermoplastic continuous material.

According to an embodiment of the device of any prior paragraph(s), the fuel-to-oxidizer ratio varies within the solid element, thereby producing one or more variations in burn rate, or variation of combustion temperature.

According to another aspect of the invention, a method of producing a combustible element includes: successively depositing multiple layers of the element in an additive manufacturing process; wherein the depositing each of the layers includes depositing a matrix of discrete fuel regions that include a fuel material, and discrete oxidizer regions that include an oxidizer material, for that layer.

According to an embodiment of the device of any prior paragraph(s), the depositing includes selectively depositing fuel material and oxidizer material from heads that are movable relative to the combustible element.

According to an embodiment of the device of any prior paragraph(s), the heads include heads for extruding the fuel material and the oxidizer material.

According to an embodiment of the device of any prior paragraph(s), the fuel material and the oxidizer material extruded by the heads is heated material.

According to an embodiment of the device of any prior paragraph(s), the fuel material and the oxidizer material both include thermoplastic continuous material, used as an extrudable base for the materials.

According to an embodiment of the device of any prior paragraph(s), the fuel material includes a fuel additive; and the oxidizer material includes an oxidizer additive.

According to an embodiment of the device of any prior paragraph(s), the method is part of production of a larger structure that the combustible element is a portion of, with portions of the larger structure that are adjacent to the combustible element are also made by an additive manufacturing process.

According to an embodiment of the device of any prior paragraph(s), the depositing includes depositing different relative amounts of the fuel and the oxidizer in different of the layers.

According to an embodiment of the device of any prior paragraph(s), the depositing different relative amounts includes varying the ratio of the fuel regions to the oxidizer regions.

According to an embodiment of the device of any prior paragraph(s), the depositing different relative amounts includes varying size of the fuel regions and/or the oxidizer regions.

According to an embodiment of the device of any prior paragraph(s), the depositing the layers includes leaving one or more cavities within the combustible element, wherein the one or more cavities are free of deposited material.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A combustible element includes regions of fuel material interspersed with regions of oxidizer material. The element may be made by additive manufacturing processes, such as three-dimensional printing, with the fuel material regions and the oxidizer material regions placed in appropriate locations in layer of the combustible element. For example, different extruders may be used to extrude and deposit portions of a fuel filament and an oxidizer filament at different locations in each layer of the combustible element. The combustible element may define a combustion chamber within the element, where combustion occurs when the combustible element is ignited. An igniter may be positioned within or along the combustible element in order to initiate combustion. The fuel material and the oxidizer material may be selected, and their relative amounts may be controlled, such that desired relative amounts of fuel and oxidizer are present for combustion with desired characteristics, such as combustion rate. The composition and/or amounts of the fuel and oxidizer regions may be varied at different locations within the combustible element, in order to produce desired burn characteristics at different times during the burning, or at different locations in the combustible element.

The combustible element may be a thrust-producing device, such as a rocket motor. The rocket motor may be a nozzleless rocket motor, with the combustion chamber configured such that the pressurized gasses produced by the combustion become supersonic as they pass along the combustion chamber. Alternatively, the combustible element may be an energetic device used for other purposes, for example to generate pressurized gasses for filling an air bag or other structure.

Figure 1:
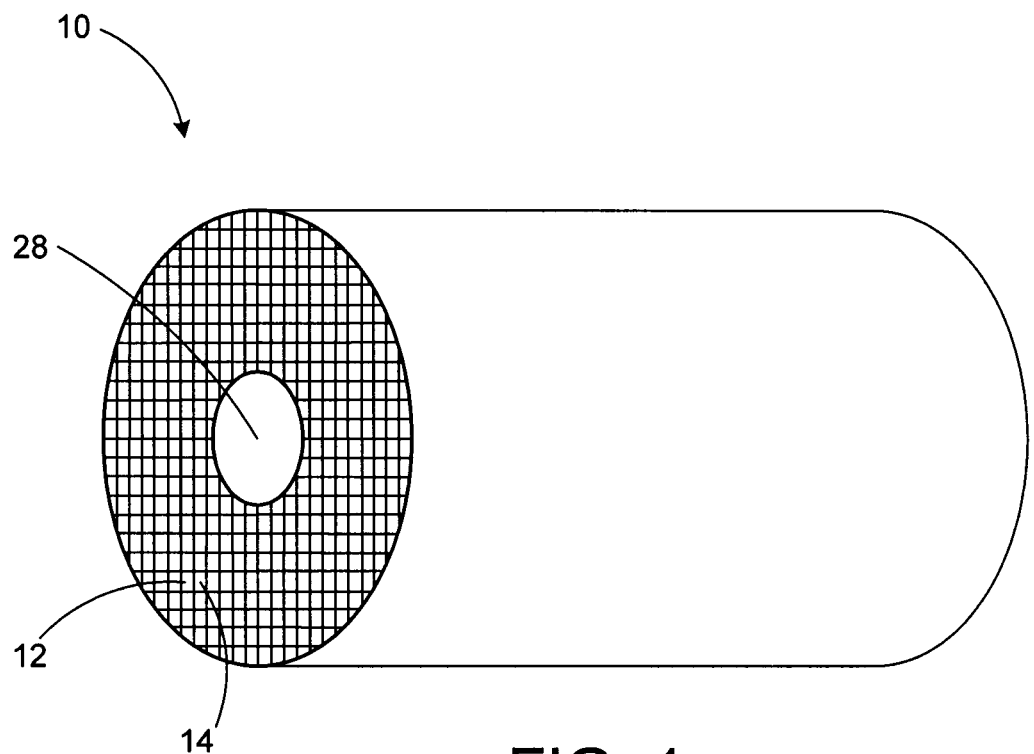
FIG. 1 is an oblique view of a combustible embodiment in accordance with an embodiment of the present invention.
Figure 2:
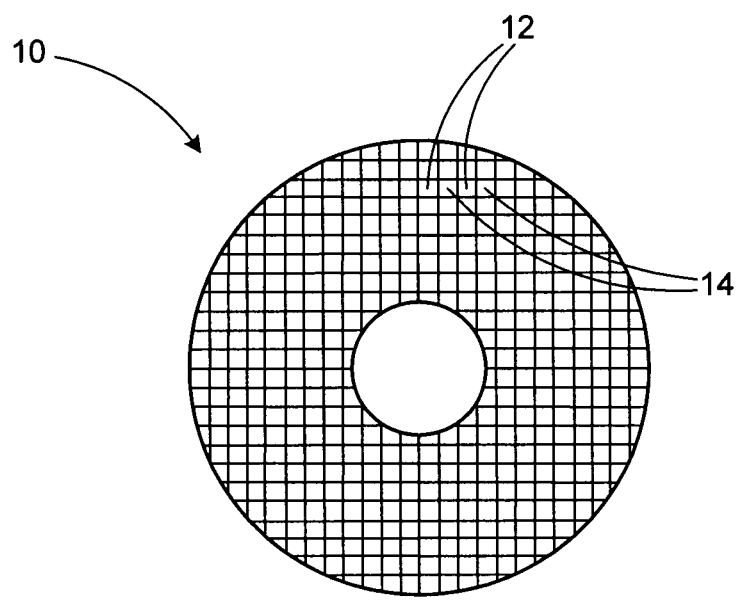
FIG. 2 is a plan view of the combustible element of FIG. 1.

FIGS. 1 and 2 show a combustible element 10 that is made up of a matrix of fuel regions 12 and oxidizer regions 14. The fuel regions 12 and the oxidizer regions 14 are interspersed throughout the combustible element 10, although the relative frequency of the different types of regions may vary with position within the combustible element 10. For example, there may be a matrix of alternating fuel regions 12 and oxidizer regions 14 within a layer. The fuel region 12 and the oxidizer regions 14 have a size that is larger than the size of individual particles of fuel and oxidizer materials. For example, the fuel regions 12 and the oxidizer regions 14 may have sizes that are on the order of 0.1 mm in extent. The size of the particles may be from 50 to 600 μm (microns) in extent, for example, such as including coarse particles (about 400 to 600 μm) and/or medium particles (50 to 200 μm).

More than one size of particles may be used. For example the oxidizer regions 14 may have multi-modal blends of multiple-sized particles in distributions to maximize the weight of oxidizer per unit volume. There may be relatively large particles that make up the bulk of the oxidizer volume, and relatively small particles with sizes selected to fill in part of the gaps between the larger particles. This increases the total potential propellant mass fraction of the element 10. Blends of different sized particles are also possible for the fuel regions 12 as well.

The fuel regions 12 may include a suitable fuel material, perhaps in conjunction with other suitable materials in order to make the fuel material suitable for use as a filament for extrusion in an additive manufacturing process. An example of a suitable fuel material is a thermoplastic continuous material doped with a metal. The thermoplastic material may be a suitable material such as polylactide (PLA), acrylonitrile butadiene styrene (ABS), or a polyamide. The added metal may be an energetic metal such as magnesium, aluminum, or zirconium. As an alternative, the thermoplastic continuous material may be used itself as a fuel, without any sort of additive.

The fuel may be added into the thermoplastic binder in powder form. The fuel powder may be mixed into the thermoplastic material during the manufacturing process of the filament itself. The powder may be controlled or characterized by typical key characteristics which include, but are not limited to, chemical reaction characteristics, grade/purity, and particle size.

The oxidizer regions 14 may also include a suitable thermoplastic material as a continuous material, such as those described in the previous paragraphs, in combination with an added oxidizer. The added oxidizer may include small droplets or beads of oxidizer material that are within the thermoplastic material. For example there may be three sizes of particles/droplets, with the two smaller sizes of particles/droplets able to be located in the spaces between adjacent large particles. Powdered oxidizer material may also be added to a thermoplastic binder material, such as during the manufacturing process of the filament used to produce the oxidizer regions 14. Characteristics taken into consideration may include chemical reactiveness, grade/purity, and particle size.

Alternatively, the added oxidizer may be a material such as strontium perchlorate, other perchlorate oxidizers (e.g., ammonium or potassium), nitrate oxidizers (e.g., ammonium or potassium), or ammonium dinitramine, to give a few possibilities.

Other materials may be used as alternatives or in addition to those discussed above. Examples include burn rate additives (e.g., n-Butyl ferrocene, oxides of copper, lead, zirconium, or iron, and other conventional burn rate additives), combustion stability additives (any of a variety of suitable metals, such as magnesium or zirconium), additives to make a translucent or other light-transmitting material opaque, solid explosive fillers, such as HMX or RDX, and processing aids that may be required to obtain desirable viscosities, stabilities, etc. that make the filaments more amenable to the fused deposition process.

Figure 3:
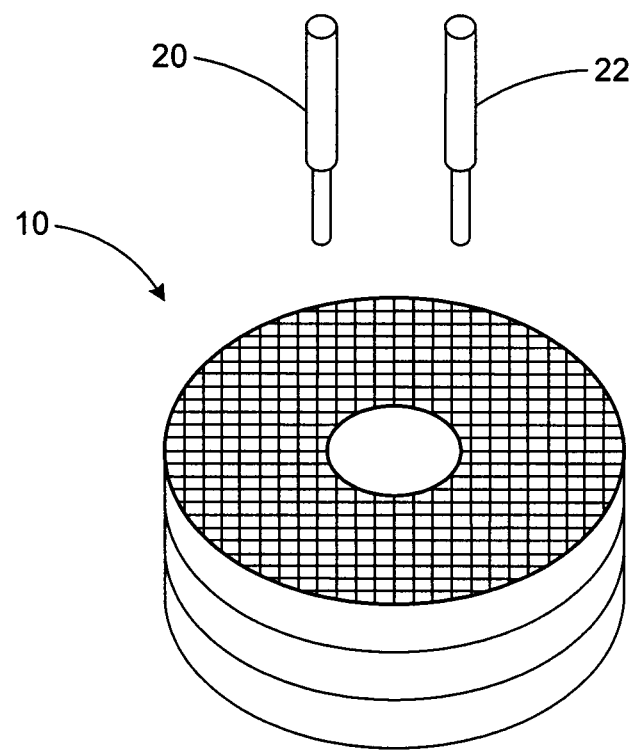
FIG. 3 is a schematic view illustrating additive manufacture of the combustible element of FIG. 1.

The regions 12 and 14 may be placed in an ordered configuration in which the regions 12 and 14 are deliberately placed during manufacture of the combustible element 10. With reference now in addition to FIG. 3, the combustible element 10 may be produced using an additive manufacturing technique, using separate print heads 20 and 22, used to deposit the regions 12 and 14, respectively. The heads 20 and 22 may be computer controlled to place the regions 12 and 14 in desired locations within the element 10. The element 10 may be built up layer by layer, for example, with the heads 20 and 22 moving and dispensing material, such as filaments of fuel and oxidizer material, to provide the desired regions 12 and 14 in the desired locations within each layer. The movement of the heads 20 and 22, and the dispensing of the fuel and oxidizer material from the heads 20 and 22, may be controlled by a computer or other suitable controller. The heads 20 and 22 may move together, with suitable fuel or oxidizer material dispensed at suitable locations and in suitable amounts at selected locations. The fuel and oxidizer materials (for example suitable filaments of the materials) may be heated and extruded at the desired locations, as part of a fused deposition additive manufacturing process.

Suitable machines for performing this function include any of a variety two-extruder fused deposition modeling (FDM) machines, or more broadly all suitable FDM machines with at least two extruders such that the deposited quantity of fuel and oxidizer filaments can vary independently. The nozzle extruder deposition diameter for such machines may be at least approximately twice the maximum fuel particle size distributed within the filament. Machines for performing other sorts of additive manufacturing processes are alternatives to the use of FDM machines.

There may be any of a variety of variations in the regions 12 and 14 throughout the element 10. The relative amounts of fuel and oxidizer may be varied at different locations within the element 10 by varying the size, composition, and/or placement of the regions 12 and 14. For example, at different longitudinal (axial) and/or radial locations within the element, there may be different ratios of fuel regions 12 to oxidizer regions 14, to provide different combustion characteristics when burning different parts of the element 10.

Varying or controlling the fuel-oxidizer mixture ratio may involve varying the fuel geometry, or the fuel material or blend of materials that make up the fuel. This could be done to raise or lower the flame temperature of the combustion. High flame temperatures go along with high combustion efficiency and high thrust performance. Low flame temperatures result in lower combustion efficiency, but cooler output for gas generator or non-thrust uses. For example, a relatively low flame temperature may be required for a gas generator that is used as a start cartridge to start a turbine engine, such as for a missile such as a cruise missile. In such a situation it is desirable to generate a large gas volume flow rate, without the gas having a high temperature that might stress components of the turbine engine. In contrast, a thrust-producing fuel element could have a greater amount of oxidizer, which would result in high temperature combustion with increased efficiency.

The additive manufacture of the element 10 may also include leaving open spaces or chambers 28 within the element 10, to serve as combustion chambers, or for other purposes. The chamber 28 may be configured as a combustion chamber in which the combustion products (pressurized gases) transition to supersonic flow within the chamber, enabling use of the element 10 as a rocket motor. Other purposes for the spaces or chambers 28 may include embedding additional components, such as igniters, in the element.

In the illustrated embodiment the element 10 has a cylindrical shape, and the chamber 28 is a central opening in the element 10. Alternatively the element 10 may have any of a wide variety of regular or irregular other shapes, and/or there may be chambers or open spaces of any of a variety of shapes, suitable for use as combustion chambers, or for other purposes.

Figure 4:
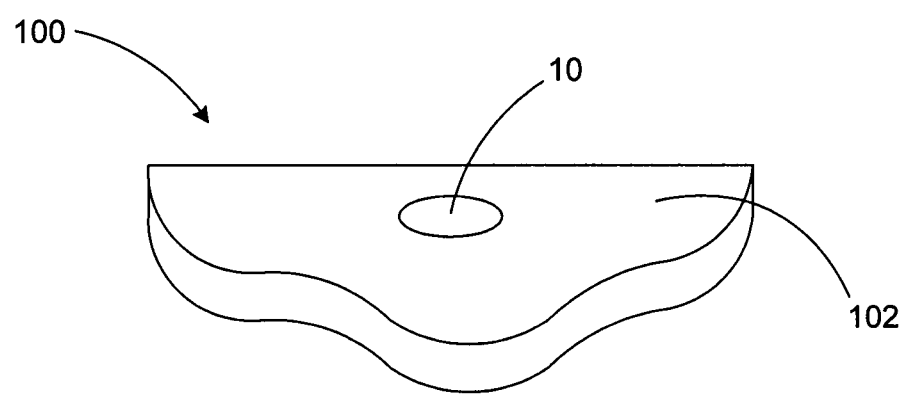
FIG. 4 is an oblique view showing the combustible element of FIG. 1 as part of a structural part.

Referring now to FIG. 4, the element 10 may be part of a larger structure 100, which also may be formed in an additive manufacturing process. Material 102 of the structure 100 may surround the element 10. The material 102 may be continuous with the material of the element 10, and may be made of a similar type of material, and/or may be manufactured using a similar process. For example, the material 102 may be based on a thermoplastic material, for example the same thermoplastic material used as a continuous material for the fuel regions 12 and/or the oxidizer regions 14 (FIG. 1).

The thermoplastic or other material of the larger structure 100 may also function to some extent as a fuel, since it may be combustible. However the element 10 may be configured to avoid or limit combustion of the material 102, for instance by limiting the amount of oxidizer in the element 10. This may allow the structure 100 to avoid undue weakening from the combustion of the element 10.

Figure 5:
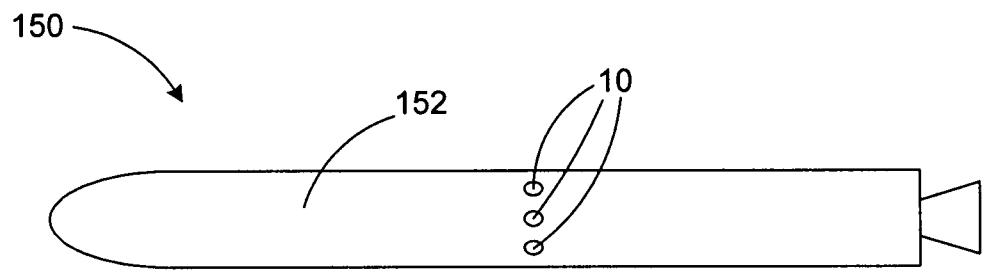
FIG. 5 is an oblique view of a first flying vehicle that includes combustible elements, in accordance with an embodiment of the invention.
Figure 6:
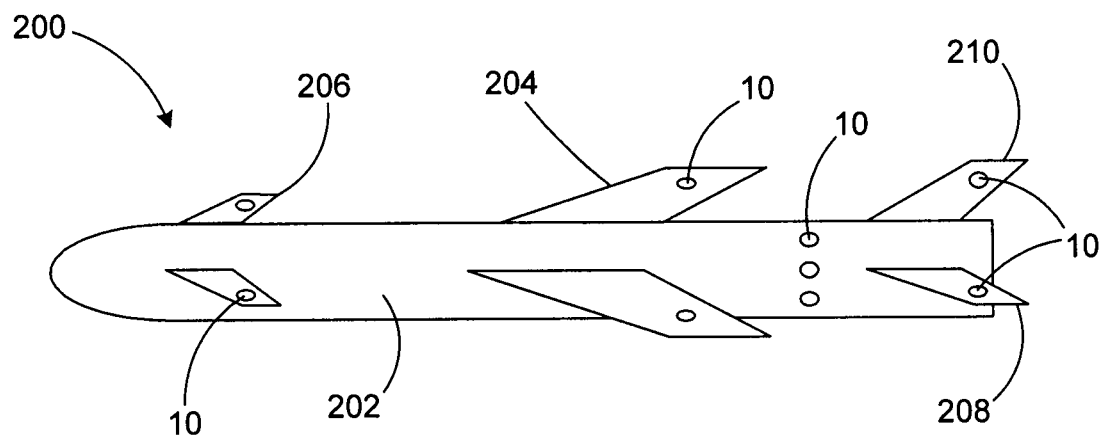
FIG. 6 is an oblique view of a second flying vehicle that includes combustible elements, in accordance with an embodiment of the invention.

The larger structure 100 may be part of a fuselage or other portion of a flying vehicle, such as a space vehicle 150 (FIG. 5) or an air vehicle 200 (FIG. 6). As seen with reference to those two figures, the elements 10 may be placed at suitable locations around the vehicles 150 and 200, to serve as rocket motors or other thrust-producing elements. Elements 10 may be located in a fuselage 152 of the space vehicle 150, or in a fuselage 202, wings 204, canards 206, elevators 208, and/or a rudder 210 of the air vehicle. The elements 10 may be selectively fired for steering, changing orientation, course correction, or other purposes.

As an alternative to be a unitary part of a larger structure 100, the element 10 may be an insert that is formed separately and placed within a suitable opening in the structure 100. The element 10 may be placed within a casing, such a metal casing, prior to be inserted into the opening in the structure 100.

The combustible element and the associated structures provide many benefits. The composition of the element can be controlled and tailored to achieve specific desired burn characteristics. Chambers within the element can be constructed during formation of the element, with a wide range of geometry of the chambers achievable. The element may be easily integrated with a wide variety of different structural parts, such as parts of flying vehicles. In addition, the combustible element may be used for other purposes, such as for production of pressurized gases to fill an air bag or other structure.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of producing a combustible element, the method comprising:
  successively depositing multiple layers of the element in an additive manufacturing process;

wherein the depositing each of the layers includes depositing a matrix of discrete fuel regions that include a fuel material, and discrete oxidizer regions that include an oxidizer material, for that layer.

2. The method of claim 1, wherein the depositing includes selectively depositing fuel material and oxidizer material from heads that are movable relative to the combustible element.

3. The method of claim 2, wherein the heads include heads for extruding the fuel material and the oxidizer material.

4. The method of claim 3, wherein the fuel material and the oxidizer material extruded by the heads is heated material.

5. The method of claim 3, wherein the fuel material and the oxidizer material both include thermoplastic continuous material, used as an extrudable base for the materials.

6. The method of claim 5,
wherein the fuel material includes a fuel additive; and
wherein the oxidizer material includes an oxidizer additive.

7. The method of claim 1, wherein the method is part of production of a larger structure that the combustible element is a portion of, with portions of the larger structure that are adjacent to the combustible element are also made by an additive manufacturing process.

8. The method of claim 1, wherein the depositing includes depositing different relative amounts of the fuel and the oxidizer in different of the layers.

9. The method of claim 8, wherein the depositing different relative amounts includes varying the ratio of the fuel regions to the oxidizer regions.

10. The method of claim 8, wherein the depositing different relative amounts includes varying size of the fuel regions and/or the oxidizer regions.

11. The method of claim 1, wherein the depositing the layers includes leaving one or more cavities within the combustible element, wherein the one or more cavities are free of deposited material.

* * * * *